United States Patent [19]

Brunskole

[11] 4,221,365
[45] Sep. 9, 1980

[54] ADJUSTABLE CABLE DRAW MECHANISM
[75] Inventor: Joseph H. Brunskole, Rexdale, Canada
[73] Assignee: Pilgrim Technical Products Ltd., Mississauga, Canada
[21] Appl. No.: 14,367
[22] Filed: Feb. 23, 1979
[51] Int. Cl.³ ............................. B66D 1/36; F16L 3/16
[52] U.S. Cl. ...................................... 254/398; 248/55; 254/413; 254/134.3 R
[58] Field of Search ................. 254/190, 134.3, 135 R; 248/55, 49; 104/191

[56] References Cited

U.S. PATENT DOCUMENTS

| | | | |
|---|---|---|---|
| 2,948,513 | 8/1960 | Krohn-Holm | 254/190 R |
| 3,426,988 | 2/1969 | Bradley | 248/55 |
| 3,602,467 | 8/1971 | Thomas | 248/55 |
| 3,637,175 | 1/1972 | McElroy | 248/55 |
| 3,770,233 | 11/1973 | McElroy | 248/55 |

FOREIGN PATENT DOCUMENTS 1078001  8/1967  United Kingdom ...................... 248/55

Primary Examiner—Edward J. McCarthy
Attorney, Agent, or Firm—Joseph P. Gastel

[57] ABSTRACT

An adjustable cable draw mechanism including a pair of interlocking elongated channel members slidable relative to each other so as to vary their combined length, a plurality of rollers mounted in end-to-end relationship and lengthwise on each of the channel members, hooks on the outer ends of the channel members for mounting the channel members in underslung relationship to the sides of a cable tray, and adjustable mountings for the hooks to both vary their height and their position on the channel members.

6 Claims, 8 Drawing Figures

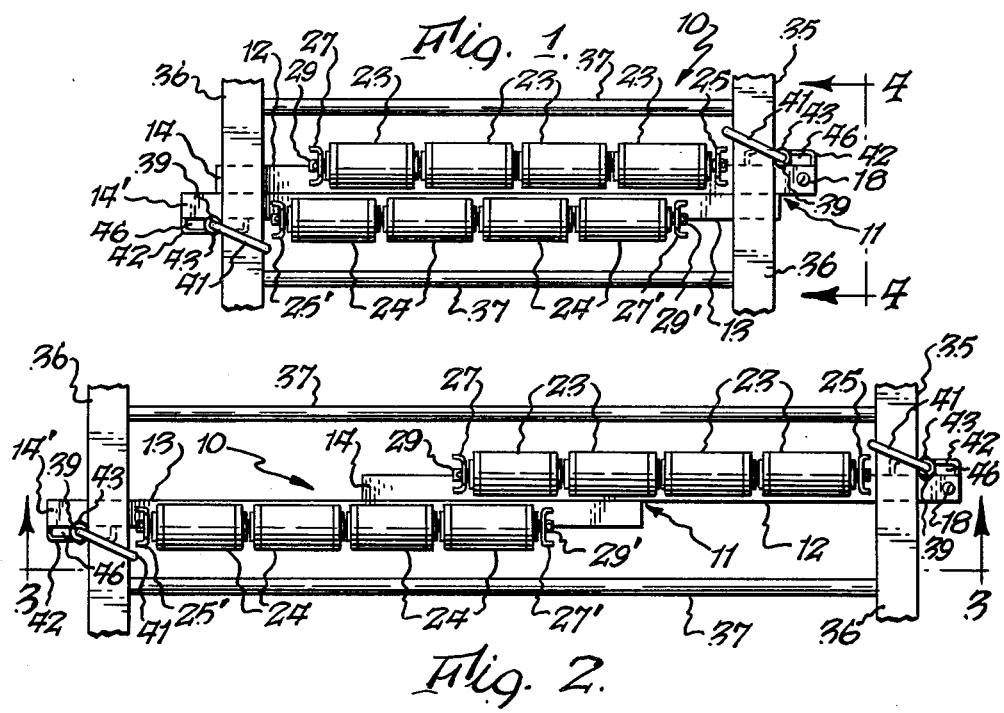
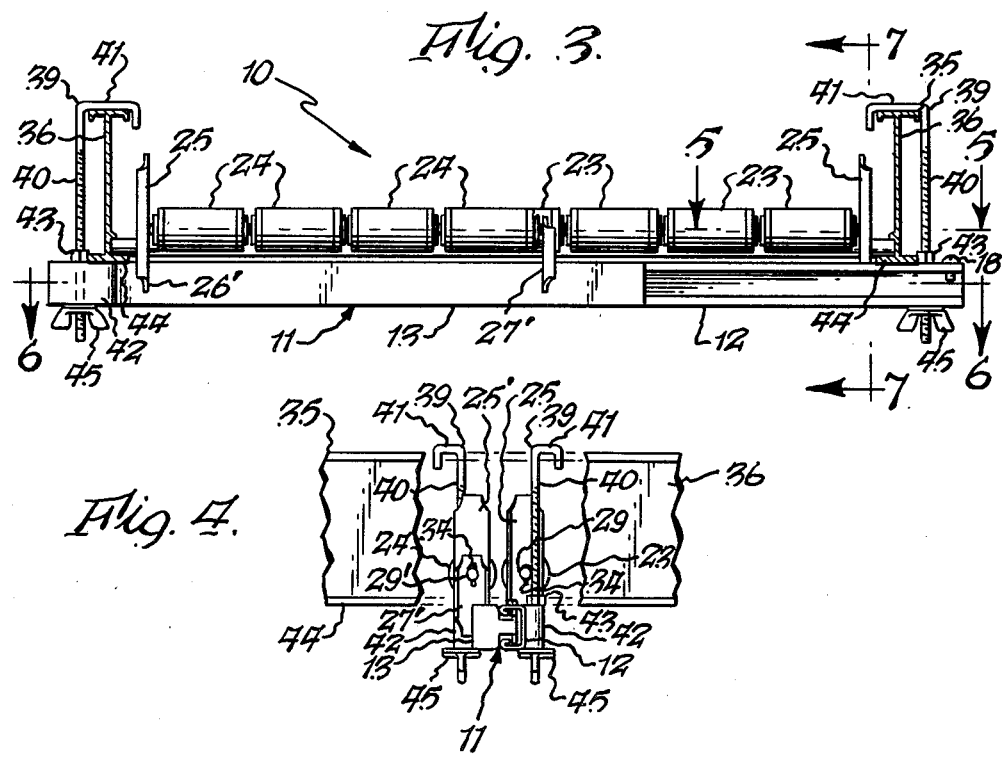

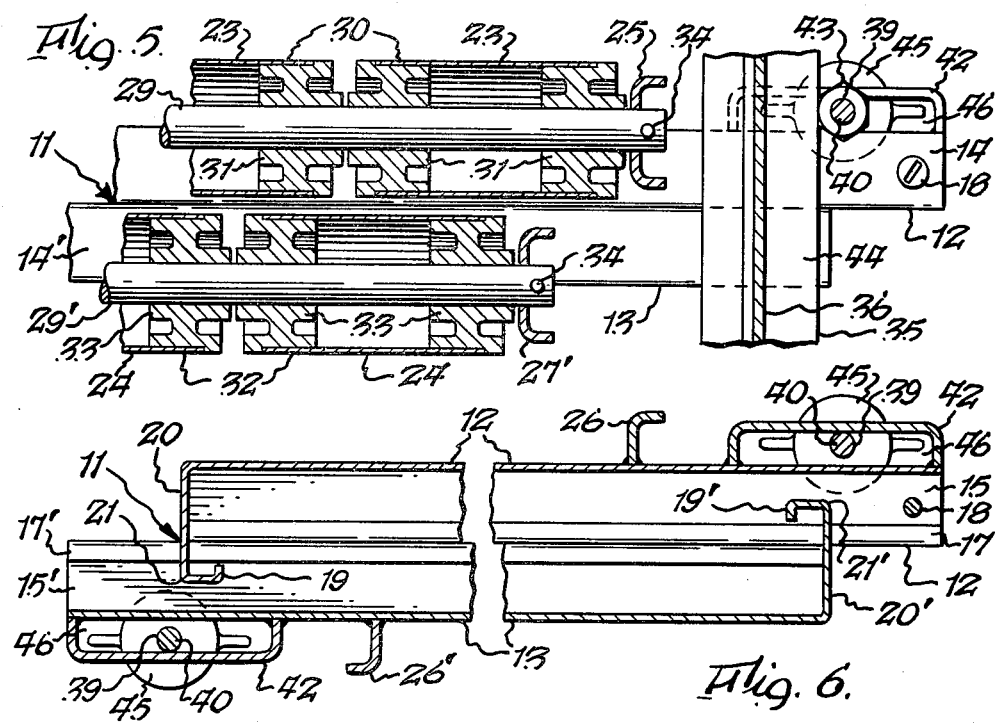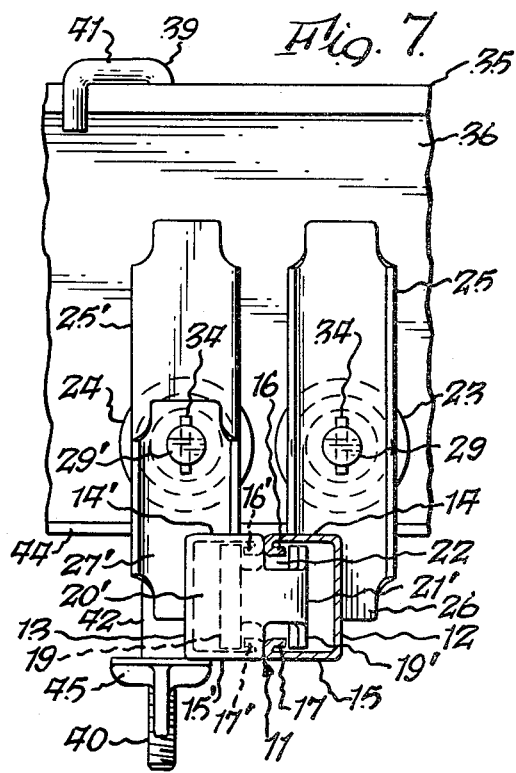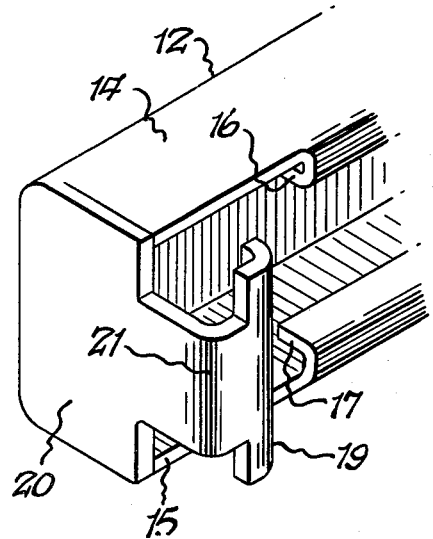

ADJUSTABLE CABLE DRAW MECHANISM

BACKGROUND OF THE INVENTION

The present invention relates to a cable draw mechanism which is adjustable for use with cable trays of various widths and heights.

By way of background, cable trays are used for the purpose of supporting various types of cables and conduits. When the cables are installed, they are drawn lengthwise across the rungs in the cable tray. In the past, cable draw mechanisms have been used to support the cables which are being drawn through the tray. The cable draw mechanisms generally include rollers which support the cables being drawn, to thereby decrease the friction which would otherwise result if the cables were drawn along the rungs themselves. In the past the cable draw mechanisms were not adjustable for different widths and heights of trays, and therefore special cable draw mechanism had to be made for each size and type of tray. It is with overcoming the foregoing deficiency of prior cable draw mechanisms that the present invention is concerned.

SUMMARY OF THE INVENTION

It is the object of the present invention to provide an improved cable draw mechanism which is simple and easily adjusted to fit cable trays of different widths, and which is fabricated from simple components in a highly expedient manner. Other objects and attendant advantages of the present invention will readily be perceived hereafter.

The present invention relates to an adjustable cable draw mechanism comprising first and second roller means for supporting cables, inner and outer ends on each of said first and second roller means, said first and second roller means having first and second longitudinal axes, respectively, base means for mounting said first and second roller means with said first and second longitudinal axes substantially parallel and with said inner ends in overlapping relationship in a direction transverse to said longitudinal axes, and adjusting means on said base means for shifting said first and second roller means relative to each other in the direction of said first and second longitudinal axes, respectively, to move said outer ends relative to each other while maintaining an overlapping relationship of said inner ends. The various aspects of the present invention will be more fully understood when the following portions of the specification are read in conjunction with the accompanying drawings wherein:

BRIEF DESCRIPTION OF THE DRAWINGS

FIG. 1 is a fragmentary plan view of the adjustable cable draw mechanism of the present invention mounted on a relatively narrow cable tray;

FIG. 2 is a fragmentary plan view of the adjustable cable draw mechanism of the present invention mounted on a relatively wide cable tray;

FIG. 3 is a cross sectional view taken substantially along line 3—3 of FIG. 2;

FIG. 4 is a fragmentary view taken substantially in the direction of arrows 4—4 of FIG. 1;

FIG. 5 is an enlarged fragmentary cross sectional view taken substantially along line 5—5 of FIG. 3 and showing both the roller construction and a portion of the mounting hook structure;

FIG. 6 is an enlarged fragmentary cross sectional view taken substantially along line 6—6 of FIG. 3 and showing the interlocking tongues for holding the base members together;

FIG. 7 is an enlarged fragmentary cross sectional view taken substantially along line 7—7 of FIG. 3 and showing further details of the adjustable cable draw mechanism from this viewpoint; and FIG. 8 is a fragmentary perspective view of the inner end of one of the base members at which the interlocking tongue is located.

DESCRIPTION OF THE PREFERRED EMBODIMENTS

The adjustable cable draw mechanism 10 includes a base 11 consisting of base members 12 and 13 in the form of channels which are so constructed so as to slide relative to each other from the position shown in FIG. 1 to the position shown in FIG. 2, or to any adjusted position therebetween. In this respect, base member 12 (FIG. 8) is essentially in the form of a channel having legs 14 and 15 with inwardly bent flanges 16 and 17, respectively. A tongue member 19 is formed integrally with end plate 20 which is suitably positioned at the end of channel 12, as shown in FIG. 8. Base member 13 has an analogous construction which is designated by primed numerals corresponding to the unprimed numerals on base member 12. In this respect, base member 13 includes legs 14' and 15' having flanges 16' and 17', respectively, and tongue 19', which is analogous to tongue 19, is formed at the end of base member 13.

A bent neck 21 connects tongue 19 to end plate 20. Neck 21 is of lesser width than tongue 19 so that it can enter the space 22 (FIG. 7) between flanges 16' and 17' of base member 13. The width of tongue 19 is essentially the distance between legs 14' and 15' of base member 13 (FIG. 7). Tongue 19' is located on base member 13 in an analogous manner. The width of tongue 19' of member 13 is essentially equal to the distance between legs 14 and 15 of base member 12. Therefore, when base members 12 and 13 are placed with their tongues 19 and 19', respectively, in interlocking engagement with the flanges of the opposite base member, as shown in FIGS. 5 and 7, then base members 12 and 13 can be slid longitudinally relative to each other while they maintain an assembled relationship. It is this sliding connection between base members 12 and 13 which permits the cable draw mechanism 10 to be adjusted from the position shown in FIG. 1 to the position shown in FIG. 2, so that it can be mounted on cable trays of different width by merely expanding or contracting the base 11.

A plurality of axially aligned rollers 23 are rotatably mounted on base member 12 and a plurality of axially aligned rollers 24 are rotatably mounted on base member 13. A bracket 25 has its lower end 26 cut away to fit the outer contour of channel 12 (FIG. 7) and bracket 25 is attached, as by welding, at lower portion 26 to base member 12. A bracket 25', which is the mirror image of bracket 25, is welded to the outer end of base member 13. A bracket 27, which is similar in shape to bracket 25, but shorter, is welded to the inner end of base member 12. A corresponding bracket 27' is welded to the inner end of base member 13. Brackets 27 and 27' are mirror image counterparts. A steel shaft 29 is supported between brackets 25 and 27, and a steel shaft 29' is supported between brackets 25' and 27'. Each of rollers 23 includes an outer shell 30 which is mounted on plastic bearing members 31 which are journalled on rod 29.

Each of rollers 24 includes an outer cylindrical shell 32 mounted on bearing members 33 which are journalled on shaft 29'. Pins, such as 34, are inserted through suitable holes at both ends of shafts 29 and 29' to retain such shafts between their respective supporting brackets.

It can readily be seen that in all positions of base members 12 and 13, the axes of rollers 23 and 24 will remain parallel to each other. In addition, it is to be noted that both when base members 12 and 13 are collapsed, as shown in FIG. 1, or extended, as shown in FIG. 2, there will be a certain overlap of the inner ends of the rollers 23 and 24 relative to each other. In this respect, in FIG. 1 three and a half rollers 23 and 24 overlap each other, whereas in FIG. 2, approximately three-quarters of one roller 23 overlaps three-quarters of one roller 24. Thus, regardless of the amount that base members 12 and 13 are expanded or contracted relative to each other, there will always be a roller which will be contacted by a cable which is located anywhere between brackets 25 and 25'. It is further to be noted that brackets 25 and 25' (FIG. 3) extend considerably above rollers 23 and 24. Therefore, brackets 25 and 25' also function as guide members to prevent any cables from moving to the right off of rollers 23 or to the left off of rollers 24, while such cables are being drawn. It is to be noted that the highest points of brackets 27 and 27' are below the upper levels of rollers 23 and 24 so that they will not interfere with the movement of cables laterally along rollers 23 and 24.

In order to mount cable draw mechanism 10 on a cable tray 35 having I-beam shaped side rails 36 and rungs 37, mounting hooks 39 and associated structure are provided. Each mounting hook 39 includes an elongated threaded shank 40 with a right angle hook portion 41 at its upper end. The lower end of shank 40 fits through U-shaped plate 42 which is welded to the side of a respective base member 12 or 13. After the base member, such as 12, is positioned up so that its upper side abuts lower flange 44 of I-beam 36, the hook 39 is adjusted in length so that hook portion 41 engages the upper flange. This is achieved by tightening wing nut 45. A nut 43 is threaded on shank 40 to prevent the loss of hook 39.

It can readily be seen that the shank 40 of each hook 39 can be moved back and forth in the space 46 defined by each U-shaped bracket 42. Thus, after base members 12 and 13 are adjusted so that brackets 25 and 25' are as close to side rails 36 as possible, the shanks 40 of hooks 39, which are to be mounted on the side rails, are moved inwardly toward the side rails as much as possible, after which the wing nuts 45 are tightened to secure the hooks in position. It can readily be seen that the space 46 within brackets 42 permits the hooks 40 to be used with different widths of side rails, by merely causing such hooks to abut the flanges of the side rails, as shown in FIG. 3, and thereafter pivoting the hooks about the longitudinal axes of their shanks 40 to cause the hook portions 41 to firmly engage the opposite sides of the side rails.

A retaining rivet 18 is located at the end of base member 12 which prevents member 12 from sliding out of member 13.

It can thus be seen that the improved adjustable cable draw mechanism of the present invention is manifestly capable of achieving the above enumerated objects, and while preferred embodiments have been disclosed, it will be appreciated that the present invention is not limited thereto, but may be otherwise embodied within the scope of the following claims.

What is claimed is:

1. An adjustable cable draw mechanism comprising first and second roller means for supporting cables, inner and outer ends on each of said first and second roller means, said first and second roller means having first and second longitudinal axes, respectively, base means for mounting said first and second roller means with said first and second longitudinal axes substantially parallel and with said inner ends in overlapping relationship in a direction transverse to said longitudinal axes, and adjusting means on said base means for shifting said first and second roller means relative to each other in the direction of said first and second longitudinal axes, respectively, to move said outer ends relative to each other while maintaining an overlapping relationship of said inner ends. itudinal axes, respectively, to move said outer ends relative to each other while maintaining an overlapping relationship of said inner ends.

2. An adjustable cable draw mechanism as set forth in claim 1 wherein each of said first and second roller means comprise a plurality of rollers having a total fixed length.

3. An adjustable cable draw mechanism as set forth in claim 1 wherein said base means comprise first and second base members for mounting said first and second roller means, respectively, and wherein said adjusting means comprises a slidable connection between said first and second base members.

4. An adjustable cable draw mechanism as set forth in claim 3 including first and second guide members on said outer ends of said first and second roller means for limiting movement of cables outwardly beyond said second ends.

5. An adjustable cable draw mechanism as set forth in claim 4 including first and second mounting means on said first and second base members for mounting said base means on a cable tray, and means for varying the distance of said first and second mounting means from said first and second guide members, respectively.

6. An adjustable cable draw mechanism as set forth in claim 4 wherein said first and second base members comprise channels with their open sides facing each other, legs on said channels, inwardly extending flanges on said legs, and an interlocking tongue on the inner end of each of said channels for sliding engagement with coacting flanges on the other of said channels.

* * * * *

UNITED STATES PATENT AND TRADEMARK OFFICE
CERTIFICATE OF CORRECTION

PATENT NO. : 4,221,365

DATED : September 9, 1980

INVENTOR(S) : Joseph H. Brunskole

It is certified that error appears in the above-identified patent and that said Letters Patent are hereby corrected as shown below:

Column 1, line 27, change "simple" to --simply--.

Column 4, lines 28, 29 and 30, (claim 1), cancel "itudinal axes, respectively, to move said outer ends relative to each other while maintaining an overlapping relationship of said inner ends."

Signed and Sealed this

Eleventh Day of November 1980

[SEAL]

*Attest:*

*Attesting Officer*

SIDNEY A. DIAMOND

*Commissioner of Patents and Trademarks*